July 6, 1965    J. F. McGIVERN, JR    3,193,741
INTEGRAL MULTIPLE RECTIFIER CIRCUIT HAVING LEAD OXIDE LAYER
Filed Feb. 19, 1962    2 Sheets-Sheet 1

United States Patent Office 3,193,741
Patented July 6, 1965

3,193,741
INTEGRAL MULTIPLE RECTIFIER CIRCUIT HAVING LEAD OXIDE LAYER
James F. McGivern, Jr., Philadelphia, Pa., assignor to The Electric Storage Battery Company, a corporation of New Jersey
Filed Feb. 19, 1962, Ser. No. 173,987
10 Claims. (Cl. 317—238)

This application is a continuation-in-part of my co-pending application Serial No. 78,949, filed December 28, 1960, and now abandoned.

The present invention generally relates to electric signal translating elements. More specifically, the present invention is concerned with solid state signal translating elements of the type comprising a metallic base element having a layer formed thereon of an oxide of the metal base element.

An object of the present invention is to provide an electric signal translating element which is characterized by simplicity of construction and ease and low cost of manufacture.

While not limited thereto the present invention is particularly adapted for use as a rectifying element and it is a further object of the present invention to provide a single unit full wave solid state rectifier having a two-terminal A.C. input.

In accordance with the present invention a base of lead, lead calcium alloy, lead antimony alloy, or other lead base alloy, is provided with an oxide layer which may be either lead monoxide (PbO) or lead dioxide ($PbO_2$) or combinations thereof. It has been found that devices of this character have unique electrical properties among which are those of rectification and amplification. More specifically, there is provided an element having at least three spaced electrical contacts with the oxide surface layer and one electrical contact with the lead or lead alloy base layer. By way of illustration of such an element, a rectifier may be constructed utilizing a lead base which is strongly anodized in sulfuric acid forming thereon a surface layer of lead dioxide. Three spaced colinear electrical contacts are made with the lead dioxide layer and one contact is made with the lead base layer. When an alternating current is applied between the outermost oxide layer contacts there is developed between the central oxide layer contact and the lead base contact either a full wave rectified signal or a half wave rectified signal of either phase of the alternating current signal depending upon the spacing of the contacts. Still further, it has been observed that if a bias voltage is applied between certain of the contacts, that the ohmic resistance between the other contacts varies in accordance with variations in the applied voltage. For example, with the application of certain bias voltages the element may be made to exhibit negative resistance characteristics. In this sense the device performs as an amplifier.

While the mechanism responsible for the behavior described is not fully understood, it is believed that it can be attributed to the rectification characteristics of an intermediate oxygen deficient layer which develops between the outer oxide layer and the lead or lead alloy base and to the field effect variations, i.e., changes in the mobility and number of charge carriers available for conduction in the lead oxide layer under the influence of the applied electric fields. The effects discussed can be attributed to the intimate contact existing in the element between two materials both of which are considered n-type conductors in which the number of available carriers differs widely.

The entire element may be looked upon as a closed system in which the majority of the carriers available in the entire system resides in the lead base, a condition which amounts to an entropy which is lower than that which would be found in a single homogeneous conductor.

If an attempt is made to remove electrons from the oxide part of the system into the lead side, the preponderance of them in one side would be further increased, so that entropy would be further decreased. Since change in entropy is a negative function of the internal energy of the system, the decrease of entropy would be associated with an increase of internal energy of the same. That is, more work would have to be done on such a system in order to move electrons from oxide into lead, therefore the electron current "passing" direction is from lead to oxide.

The passage of a current in an element such as this is an irreversible process. In such a process, its steady state is that in which the rate of entropy production has the minimum value consistent with the external constraints, i.e., the external circuit, which prevents the system from reaching equilibrium. In addition, in the two-sided system described, the energy of the electrons is at two different levels. Electrons in the oxide exist in a lower energy state than those in the lead.

In attempting to cause conduction in the system, energy is added to the system which is in contact with its environment. An electron can make a transition between the two states by exchanging energy with its surroundings, at temperature T, or by interacting with the energy being added.

It can be shown that the probability ($a$) per unit time for a transition from the lower energy state (O) to the upper energy state (E) due to coupling with the surroundings is given by:

$$\frac{dp_1}{dt} = (a\alpha + b)p_2 - (a+b)p_1 \tag{1}$$

where $p_2$ and $p_1$ are the probabilities of finding an electron in upper and lower states, respectively, $b$ is the symmetric transition probability per unit time due to interaction with the energy being added and $$\alpha = e\frac{E}{T}$$

The steady state is given by:

$$p_1 = \frac{a\alpha + b}{a\alpha + a + 2b} = \frac{\alpha + \beta}{\alpha + 1 + 2\beta} \tag{2}$$

where $$\beta = \frac{b}{a}$$

Of course, $p_1 + p_2 = 1$. Depending, then, on the direction of the incoming energy, the relationship between transitions due to coupling with the surroundings with respect to those due to coupling or interaction with the incoming energy will vary, giving rise to variation in $p_1$ (Eq. 2) according to the direction of current in the device.

For these reasons one should understand that the objective in the production of such a device is the establishment on the lead or lead alloy base of an oxide layer in intimate mechanical contact with the same. Such a layer is best produced when formed at the expense of the lead substrate as by direct oxidation or anodization. It should be understood, however, that the intimate contact may be established mechanically by the utilization of pressure to unite a body of oxide with a lead base.

A better understanding of the present invention may be had from the following description when read with reference to the accompanying drawings of which:

Figure 1:
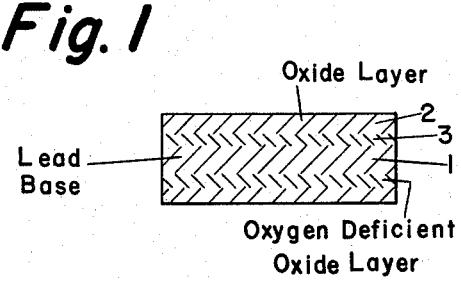
FIG. 1 is a view of a signal translating element without contacts showing the oxide layer formed thereon.
Figure 2:
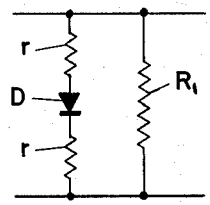
FIG. 2 is an electrical equivalent circuit of the element shown in FIG. 1.

Referring now to the drawings, FIG. 1 shows a cross-section of lead or lead alloy element 1 having an oxide layer 2 thereon which may be produced in the manner discussed hereinbefore such as by anodization of the element 1 in sulfuric acid. As shown, there exists an intermediate layer 3 of oxygen deficient lead oxide, i.e., a layer in which oxygen is not present in the stoichiometric amount corresponding to a definite compound of lead. The electrical equivalent circuit of the element shown in FIG. 1 is that shown in FIG. 2 with the resistance $R_1$ the leakage resistance attributed to discontinuities and impurities such as those which exist at grain boundaries in the lead or lead alloy substrate over which the oxide cannot form continuously and $r$ is an expression of the summation of resistance of the oxide layer 2 in the direction of maximum conductivity and D is the diode itself which is diffuse and varies in property value as the gradient of composition through the oxide layer changes.

Figure 3:
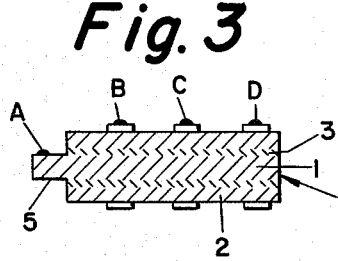
FIG. 3 is a cross-sectional view of a rectifier element in accordance with the present invention.

In accordance with one form of the present invention, a rectifier element 4 as shown in FIG. 3 was constructed. Specifically, a rod was cast of a lead antimonial alloy comprising 11% antimony and the balance lead. This rod which had a diameter of 1.5 mm. was anodized strongly in sulfuric acid having a specific gravity of 1,240 for a period of about 200 hours. After anodization, the rod was washed in water and air dried. An element 4 approximately 5/8" in length was then cut from the rod and the outside coating removed from one end thereof at 5. An electrical contact A was then made therewith by means of a solder connection. Next, three spaced electrical contacts B, C, and D were made with the oxide layer 2 by means of silver conductive paint to which lead wires were connected with solder.

Figure 4:
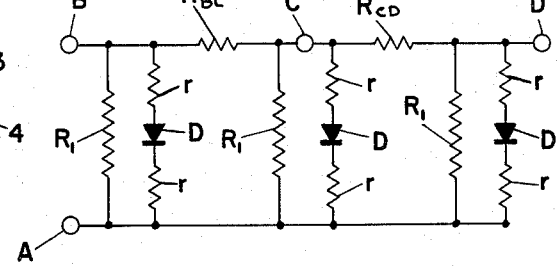
FIG. 4 is an electrical equivalent circuit of the rectifier element shown in FIG. 3.
Figure 5:
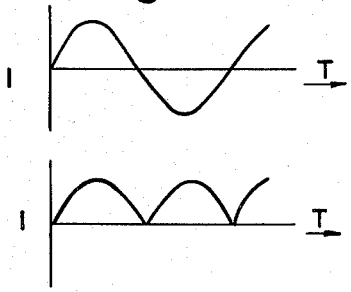
FIG. 5 illustrates input and output wave forms provided by the rectifier element shown in FIG. 3 under conditions wherein equal spacing is provided between the oxide layer contacts.
Figure 6:
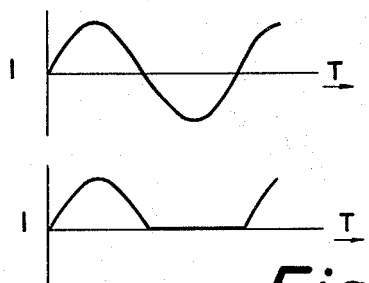
FIGS. 6 and 7 illustrate input and output wave forms provided by the rectifier device of FIG. 3 under conditions of unequal oxide layer contact spacings.
Figure 7:
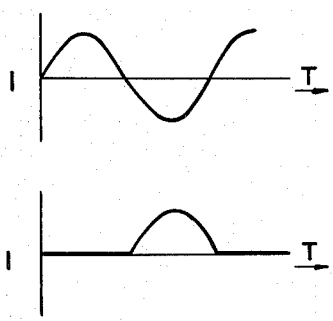

When an A.C. voltage was applied across the contacts B and D, a D.C. voltage appeared across the contacts A and C. When the spacing between the contacts B and C was made equal to the spacing between the contacts C and D, a full wave rectified voltage as shown in FIG. 5 was produced across the contacts A and C. When the spacing between the contacts C and D was made less than the spacing between the contacts B and C, a half wave rectified voltage as shown in FIG. 6 appeared between the contacts A and C. When the spacing between the contacts C and D was made greater than the spacing between the contacts B and C a half wave rectified voltage of the opposite phase was produced across the contacts A and C as shown in FIG. 7. Accordingly, the electrical equivalent circuit of the rectifier element 4 is that shown in FIG. 4 wherein the resistances $r$ are the respective resistances between the oxide layer contacts A, B, and C and the base layer 1 and the resistance $R_{BC}$ is the resistance of the lead dioxide layer between the contacts B and C and the resistance $R_{CD}$ is the resistance of the lead dioxide layer between the contacts C and D. $R_1$ represents leakage resistance due to discontinuities as discussed hereinbefore. In view of this, it is felt that the rectifier element of FIG. 4 can best be described as a tetrode which operates by the diode action of the intermediate oxygen deficient oxide layer and the interaction of electrical fields in the lead dioxide layer. Signals and biases may then be applied to this element in various ways to produce many different results. In addition, the devices themselves may be varied in accordance with the present invention, i.e., contact spacing, oxide layer thicknesses, and the like. In addition, for special purposes the number of contacts may be varied.

A full wave rectifier unit, constructed as described hereinbefore, was tested over an A.C. input voltage range of from 4.0 to 12.0 volts. A full wave D.C. output voltage that was achieved therefrom varied from 0.6 to 40.0 millivolts. As mentioned, the output was full wave with the peak voltage values in both halves of the cycle being of equal value and in sine wave form. Another element formed by anodizing a lead alloy rod 1.5 mm. in diameter for 350 hours, at 1.2 milliamperes per square centimeter in sulfuric acid of 1.25 specific gravity was utilized recharge a small nickel-cadmium storage cell. With 22.5 volts A.C. applied to the appropriate rectifier contacts, the element delivered approximately 20 milliamperes full wave D.C. to the cell. This charging current first raised the cell voltage to 1.3 volts over a period of a few hours and then as oxygen evolution and recombination in the cell began, the cell voltage rose to 1.4 volts. During this time the current tapered to 7.5 milliamperes. The charge was continued for 18 hours at which time the current had tapered to 5.0 milliamperes and had become steady. At the end of the charging period the A.C. supply was removed from the element and it was observed that the cell did not discharge through the rectifier.

A rectifier device made as described hereinbefore was tested to determine the effect of applied bias voltages on its resistance characteristics and was found to exhibit interesting non-linear resistance characteristics. With an ohmmeter connected between the contacts A and C and a bias voltage of 1.4 volts applied between the contacts B and D, the resistance between the contacts A and C was observed to change from 140,000 ohms without the bias to 70,000 ohms with the bias regardless of the polarity of the applied bias. For these measurements the positive ohmmeter terminal was connected to contact C and the ohmmeter set on the 1,000 ohm scale. With the ohmmeter connection reversed, the resistance between the contacts A and C measured 1,000,000 ohms and the bias voltage had no effect. With the ohmmeter set to the 10,000 ohm scale and its positive terminal connected to the contact C, the 1.4 volt bias applied between the contacts B and D reduced the resistance between the contacts A and C from 37,000 ohms to 30,000 ohms regardless of its polarity. With the ohmmeter connections reversed and with the contact B biased 1.4 volts positive with respect to the contact C, the resistance between the contacts A and C was changed from 120,000 ohms to 110,000 ohms. With the bias voltage reversed, the resistance change between the contacts A and C increased from 120,000 ohms to 130,000 ohms. As will be understood by those skilled in the art, these characteristics give rise to many interesting circuit applications.

Figure 8:
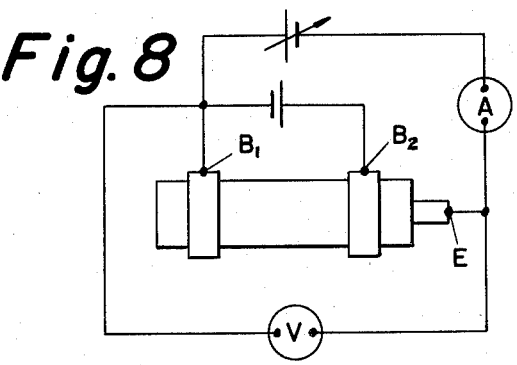
FIG. 8 is a circuit diagram showing a modification of a device in accordance with the present invention utilizing two spaced oxide contacts and wherein specific biasing arrangements are used to demonstrate the negative resistance characteristics of the device.

Referring now to FIG. 8, there is shown a circuit diagram illustrating a modification of the device in accordance with the present invention, utilizing two spaced oxide contacts $B_1$ and $B_2$ and one electrical contact E made with the lead base. This modification of the present invention, when utilized with the specific biasing arrangements illustrated, demonstrates the negative resistance characteristics of the device. The contacts $B_1$ and $B_2$ on the oxide layer may be considered as base contacts and the contact E to the lead substrate may be considered an emitter contact in analogy to transistor terminology, the transistor being of the unijunction or double base type. It should be understood, however, that the emitter in the device of FIG. 8 injects electrons as opposed to positive carriers as in the case of a silicon type device in which the polarity of the diode is also reversed.

Figure 9:
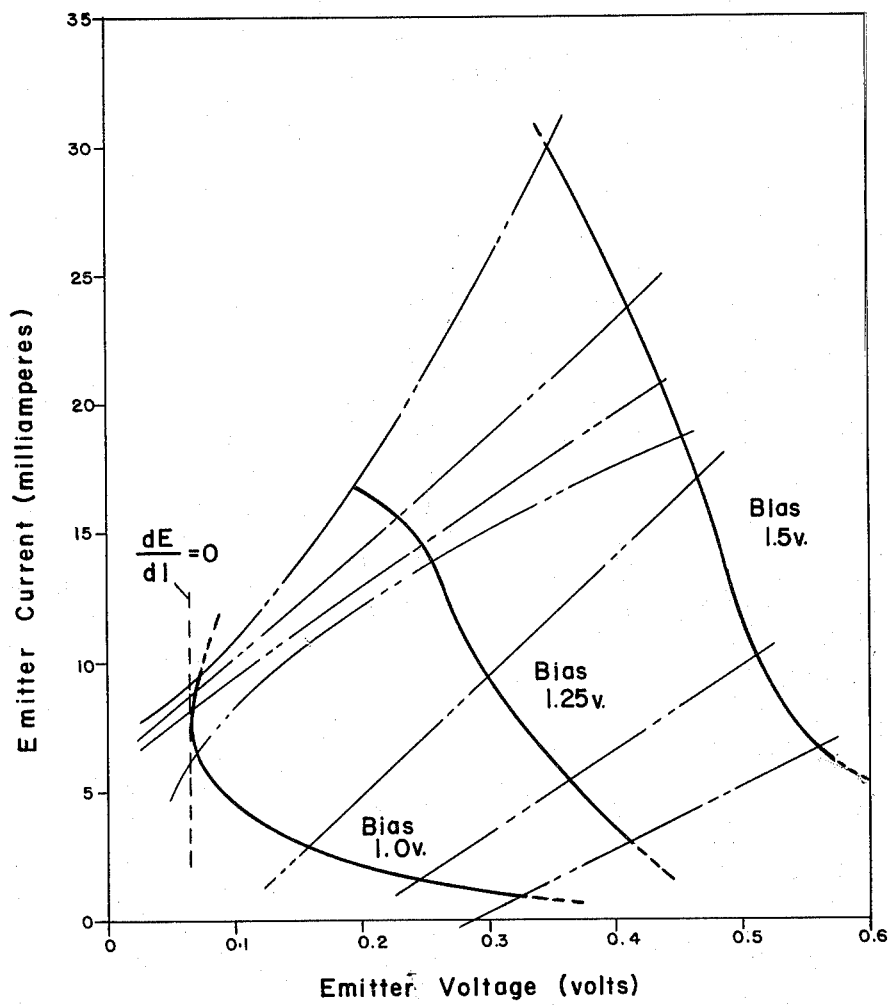
FIG. 9 is a graph showing a set of characteristics obtainable by operation of the arrangement of FIG. 8.

Referring now to FIG. 9, there is a graph showing a set of characteristics obtained by operation of the device and circuit shown in FIG. 8 which clearly illustrate the negative resistance characteristics of the device. As shown, operating characteristics are plotted for bias voltages of 1.0, 1.25, and 1.5 volts. The device of FIG. 8 for which the characteristics are plotted in FIG. 9 comprised a lead substrate coated with a lead dioxide layer. The lead base was made from a lead-11% antimony alloy wire 0.075" in diameter which was strongly anodized in sulfuric acid, washed and dried. The interbase resistance of the unit was approximately 300 ohms.

Considering the signal translating device of the present invention, it should be understood that while in the examples given hereinbefore a lead dioxide coating was produced on the lead substrate by means of anodization, that the similar characteristics can be obtained when the oxide layer produced thereon is lead monoxide. It is also not necessary that the oxide layer be produced by anodization inasmuch as direct oxidation will also produce a usable oxide film on a lead base. In addition, a layer of lead monoxide or lead dioxide may be pressed mechanically onto a lead base, but inasmuch as the intimacy of the contact between the substrate and the oxide layer and electrical continuity within the oxide itself is inferior to those produced when the oxide layer is formed at the expense of the lead base by anodization or oxidation, this method is not preferred. Still further, it should be noted that while a colinear configuration of oxide contacts has been illustrated that other physical configurations should be considered within the scope of the present invention. While silver paint has been mentioned as a method of making electrical contact to the oxide layer, it should be noted that a mere physical contact may be satisfactory for some applications and that other accepted methods of establishing the contact will also be satisfactory provided that the oxide film is not altered. It also has been found that devices produced in the manner described exhibit light sensitivity when the oxide coverings are thin. This property may be used as a further means for modulating the relationship between input signal and output response.

Having described the present invention, that which is claimed as new is:

1. An electric signal translating element comprising a metallic body of a material selected from the group consisting of lead and lead based alloys, an oxide layer on said metallic body, said oxide being selected from the group consisting of lead monoxide and lead dioxide, an electrical contact on said metallic body and a plurality of spaced electrical contacts on said oxide layer.

2. An electrical signal translating element as specified in claim 1 wherein the plurality of electrical contacts on said oxide layer are equally spaced.

3. An electrical signal translating element as specified in claim 1 wherein the plurality of electrical contacts on said oxide layer are not equally spaced.

4. An electric signal translating element as specified in claim 1 wherein there are three spaced contacts on said oxide layer.

5. An electric signal translating element as specified in claim 1 wherein there are three substantially equally spaced contacts on said oxide layer.

6. An electric signal translating element as specified in claim 1 wherein there are two spaced contacts on said oxide layer.

7. An electric signal translating element as specified in claim 1 wherein said metallic body is a rod.

8. An electric rectifier element as specified in claim 7 wherein said contact with said rod is made at one end thereof and there are a plurality of colinear, spaced contacts on said oxide layer.

9. An electric signal translating element capable of exhibiting negative resistance characteristics comprising a metallic body of a material selected from the group consisting of lead and lead based alloys, an oxide layer on said body, said oxide layer being selected from the group consisting of lead monoxide and lead dioxide, an electrical contact on said body and two spaced electrical contacts on said oxide layer.

10. An electric signal translating element as specified in claim 9 wherein said oxide layer is lead dioxide produced on said body by anodization of said body in sulfuric acid.

References Cited by the Examiner

UNITED STATES PATENTS

| 934,883 | 9/09 | Brown | 317—235 |
|---|---|---|---|
| 1,924,300 | 8/33 | Atherton | 317—238 |
| 2,486,110 | 10/49 | Bugel | 317—235 |

FOREIGN PATENTS 620,550   4/27   France.

DAVID J. GALVIN, *Primary Examiner.*